No. 897,171.　　　　　　　　　　　　PATENTED AUG. 25, 1908.
E. G. STAMPER.
DENTAL STERILIZER AND WATER HEATER.
APPLICATION FILED MAR. 9, 1907.

2 SHEETS—SHEET 1.

Witnesses:

Inventor,
Elbridge G. Stamper,
By Laws Bagger & Co.
Attorneys

No. 897,171. PATENTED AUG. 25, 1908.
E. G. STAMPER.
DENTAL STERILIZER AND WATER HEATER.
APPLICATION FILED MAR. 9, 1907.
2 SHEETS—SHEET 2.
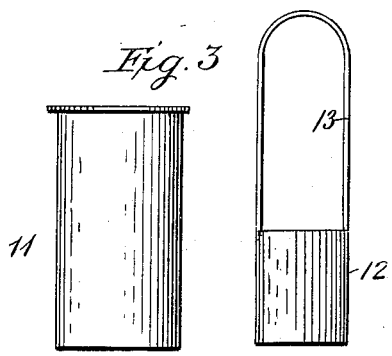
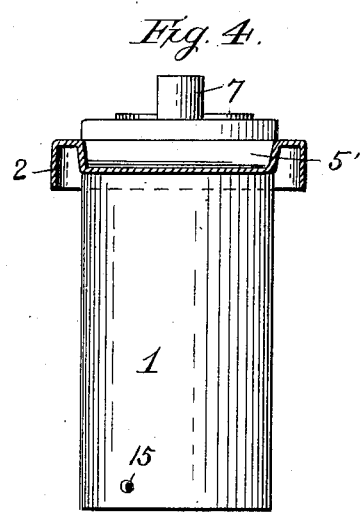
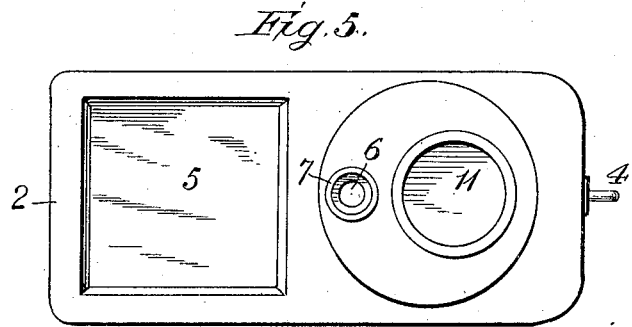
Witnesses:
Inventor:
Elbridge G. Stamper,
By
Attorneys.

UNITED STATES PATENT OFFICE.

ELBRIDGE G. STAMPER, OF PADUCAH, KENTUCKY.

DENTAL STERILIZER AND WATER-HEATER.

No. 897,171.      Specification of Letters Patent.      Patented Aug. 25, 1908.

Application filed March 9, 1907. Serial No. 361,467.

*To all whom it may concern:*

Be it known that I, ELBRIDGE G. STAMPER, a citizen of the United States, residing at Paducah, in the county of McCracken and State of Kentucky, have invented certain new and useful Improvements in Dental Sterilizers and Water-Heaters, of which the following is a specification.

My invention relates to improvements in dental sterilizers and water-heaters, especially designed for dentists' use. Its objects are to provide for convenience and facility in having the sterilizer and water-heater near the dentist's chair, always at hand and constantly ready for use and to provide for the retention of the water in its holding receptacle in a tepid condition, for instance, at all times; and to carry out these objects in a simple, economic and effective manner.

Said invention consists of certain features or instrumentalities substantially as hereinafter fully disclosed and specifically pointed out by the claims.

Figure 1:
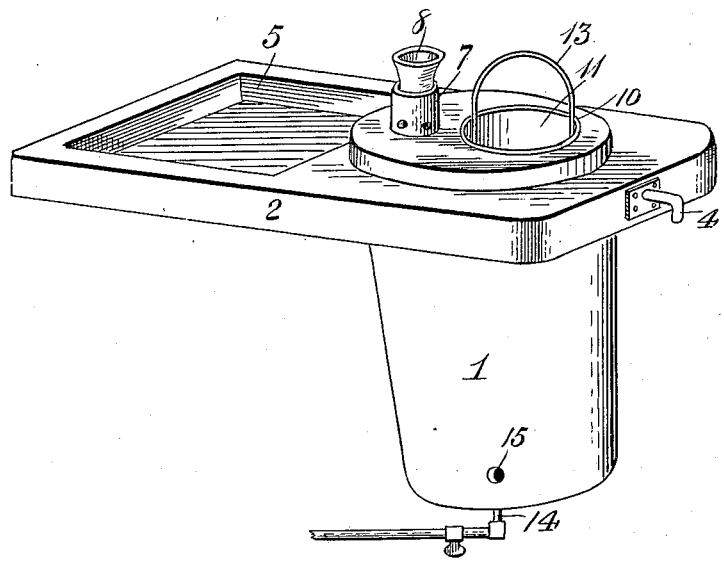
Figure 2:
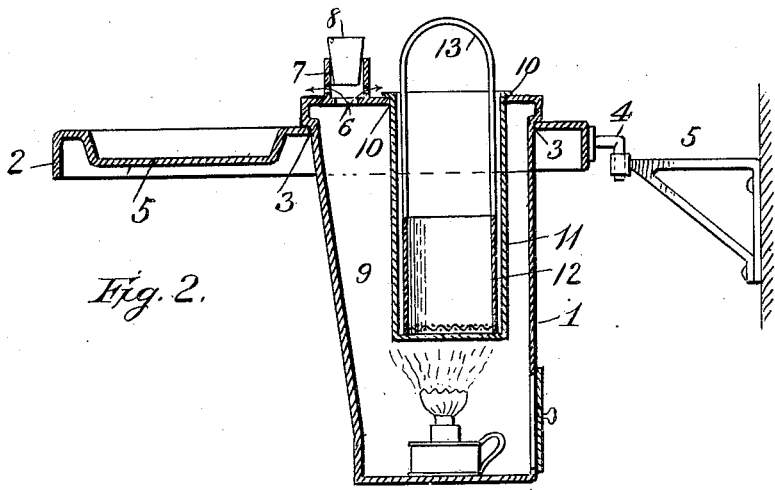

In the accompanying drawing illustrating the preferred embodiment of my invention—Figure 1 is a perspective view thereof. Fig. 2 is a vertical longitudinal section of the same. Fig. 3 shows disassembled views of receptacles used in the sterilizer and heater. Fig. 4 is a vertical transverse section taken through Fig. 1, and Fig. 5 is a plan view of the invention.

In carrying out my invention, I employ a suitable vessel or tank 1, also a tray or holder 2 through an opening 3 of which is received said vessel or tank, which tray or holder, preferably of the general structural outline as disclosed particularly by Figs. 1 and 2, is adapted to be supported by an angle-arm 4 fixed at one end thereof and effective for engagement with a bracket 5 suitably secured in position to the wall, or otherwise, contiguous to the dentist's chair. Said plate 2 has a depression 5 therein, whence the application thereto of the term tray, especially for holding or receiving small instruments. Said tank or holder has therein an opening or orifice 6; and fixed to its upper surface, around said opening is a cup-like receptacle 7 for the reception of a glass, or tumbler, as 8 for holding water for the retention of the latter at the desired temperature or in a tepid condition as will be readily apparent presently. Said tank or holder 1 has a second larger opening 10 therein which receives a water-holding vessel 11 which is suitably held in a suspended position within said tank or holder by a flange at its upper edge resting upon the latter; and which said water-holding vessel receives a supplementary receptacle 12 having a foraminous or sieve-form of bottom and preferably a bail-form of handle 13 and which supplementary receptacle is, in practice, immersed in said water-containing vessel, for the dropping therein, for sterilizing, of "burs" and other small instruments, as will be readily appreciated. The water for this purpose is held in continuous ebullition or boiling state by means of the flame from the gas in combustion delivered into the tank or holder 1, under the bottom of the water-holding vessel 11, by a gas-burner 14 applied to a gas-pipe, or this may be effected by the use of an alcohol lamp or suitable means adapted for heating purposes placed within said tank or holder, which is provided as shown with combustion-air inlet-openings 15.

As before noted, a passage or flue 9 provided by laterally flaring the tank or holder 1 upward, delivers a portion of the heat generated by the gas or lamp flame under the vessel 11, upward through the opening 6, leading into the cup-like receptacle 7, this portion of said heat being utilized to heat the water or liquid contained within the glass or tumbler 8 placed in said cup-like receptacle 7, as will be readily understood, for the purpose aforesaid.

This contrivance is exceedingly simple, readily constructed and relatively inexpensive of manufacture, and as above stated affords a means of great convenience and facility for its intended purpose.

I claim—

1. A dental sterilizer and water heater, comprising a tray, a heat-conducting tank retained in said tray, a vessel depending within said tank, a supplemental receptacle having a foraminous or screen-like bottom received in the vessel, said tank having a cup-like receptacle on its upper end around an opening for the passage of the combustion-products into said cup-like receptacle for additional heating purposes.

2. A dental sterilizer and water heater, comprising a tray, a heat-conducting tank depending through an opening in said tray and having a lateral extension or enlargement adapted to rest upon said tray, a vessel suspended within said tank, a supplemental receptacle arranged within the vessel, said tank having on its upper end a cup-like receptacle surrounding an opening for the passage of the combustion-products from said tank into said cup-like receptacle being adapted to receive a liquid holding means.

In testimony whereof I affix my signature, in presence of two witnesses.

ELBRIDGE G. STAMPER.

Witnesses:
FRANK A. LUCAS,
LIZZIE GOURLEY.